J. C. CRENSHAW.
BRAKE BAND.
APPLICATION FILED MAY 4, 1909.
966,312.
Patented Aug. 2, 1910.
2 SHEETS—SHEET 1.
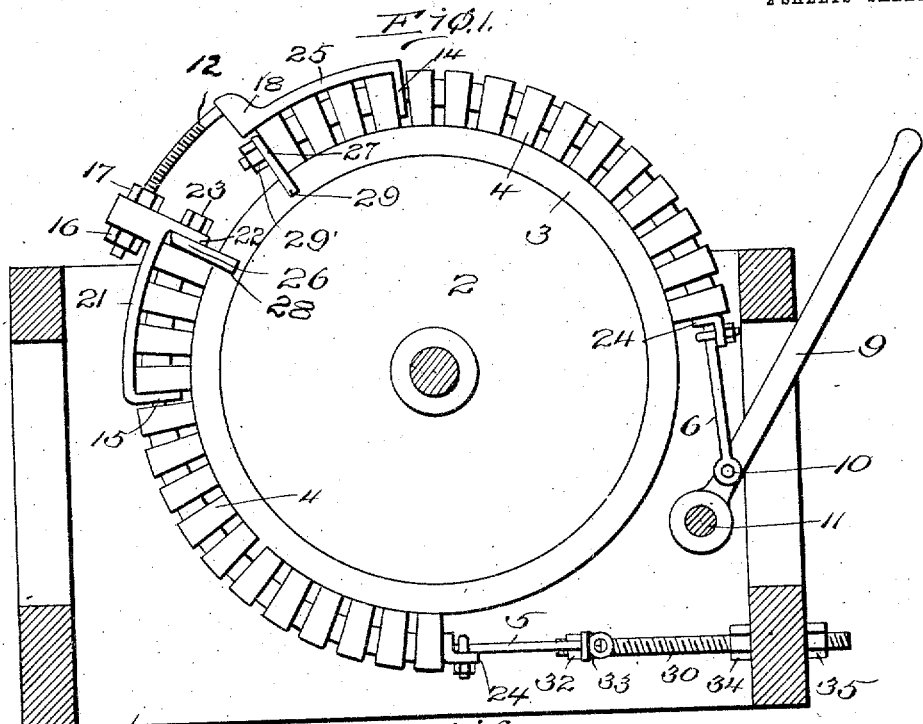
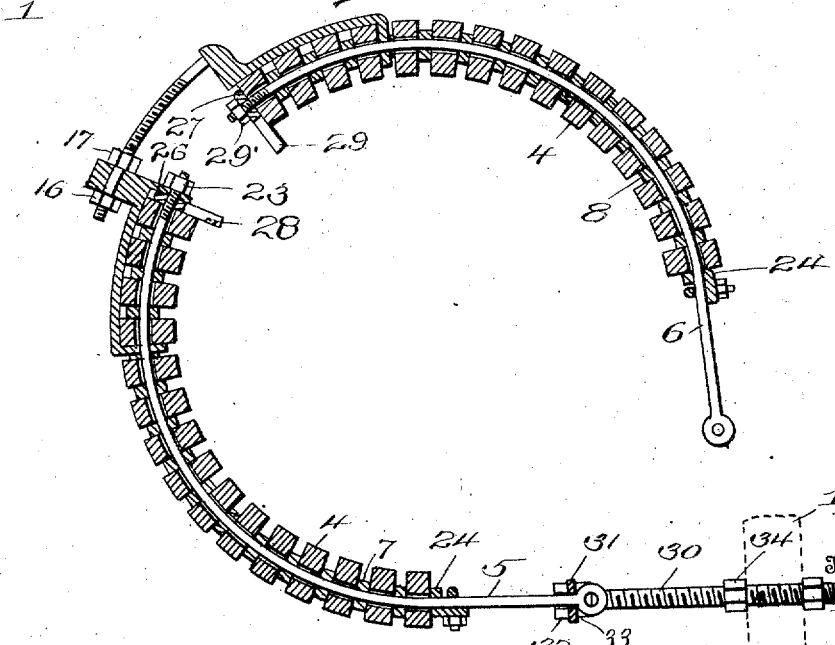

J. C. CRENSHAW.
BRAKE BAND.
APPLICATION FILED MAY 4, 1909.
966,312.
Patented Aug. 2, 1910.
2 SHEETS—SHEET 2.
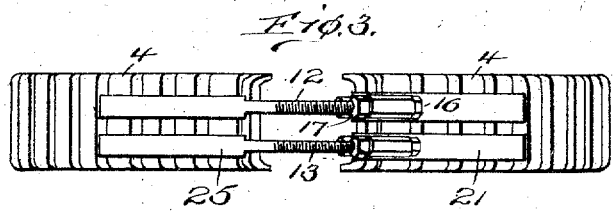
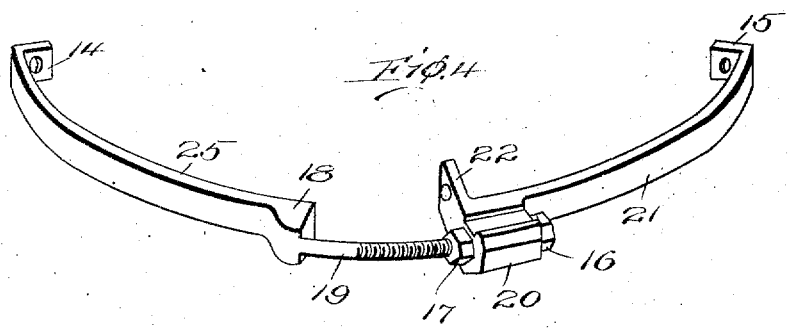
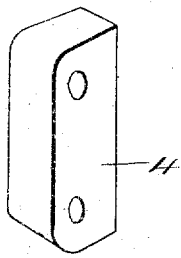 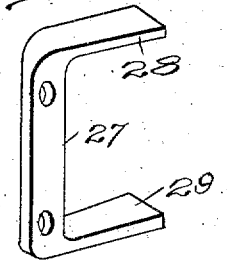
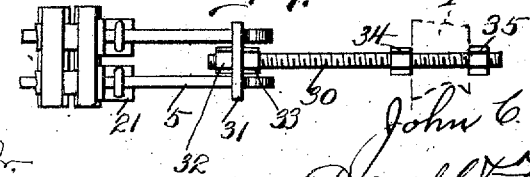

UNITED STATES PATENT OFFICE.

JOHN CRITY CRENSHAW, OF RIVERTON, ALABAMA.

BRAKE-BAND.

966,312.

Specification of Letters Patent. Patented Aug. 2, 1910.

Application filed May 4, 1909. Serial No. 493,984.

*To all whom it may concern:*

Be it known that I, JOHN CRITY CRENSHAW, a citizen of the United States, residing at Riverton, in the county of Colbert and State of Alabama, have invented certain new and useful Improvements in Brake-Bands, of which the following is a specification.

This invention relates to improvements in brake bands, and particularly to brake bands that substantially surround the brake wheel or drum, and has for an object the arrangement of means whereby a quicker braking action is secured and a quicker release is provided.

Another object of the invention is the arrangement of a take-up near the top of the band whereby the band may be adjusted as occasion may require without removal and without inconvenience to the operator.

A further object of the invention is the arrangement of a brake band having friction members loosely mounted upon a carrying rod and having positioned therebetween cushioning members whereby the friction members may be released automatically upon the release of the braking lever.

Another object of the invention is the arrangement of a take-up arranged with means for engaging the friction blocks of the brake at any desired point for increasing or decreasing the size of the brake.

With these and other objects in view the invention comprises certain novel constructions, combinations and arrangement of parts as will be hereinafter more fully described and claimed.

In the accompanying drawings: Figure 1 is a side elevation of an embodiment of the invention shown in position. Fig. 2 is a vertical section through the brake shown in Fig. 1. Fig. 3 is an edge view of the brake looking directly at the take-up. Fig. 4 is an enlarged detail perspective view of one of the take-ups. Fig. 5 is an enlarged detail perspective view of a friction block. Fig. 6 is an enlarged detail perspective view of one of the guards. Fig. 7 is a fragmentary view of an adjustable retaining bar and associated parts.

Referring to the drawing, 1 is a base or framework of any desired kind, upon which is mounted a drum 2 of any preferred type and which may be driven by any suitable means.

Mounted upon the friction wheel 3 of drum 2 is a brake embodying the invention. The brake is formed with friction blocks 4 of any desired number which are threaded upon bars 5 and 6 which are of less diameter than the apertures passing through blocks 4. Surrounding rod 5 are cushioning blocks 7 of soft wood, leather, or any other desired material, and surrounding rod 6 are cushioning blocks 8 similar to cushioning blocks 7. By the arrangement of the cushioning blocks 7 and 8 and the apertures in the blocks 4 larger than the rods carrying the blocks, a structure is presented that will release itself when lever 9 has been released by reason of the expansion of the cushioning blocks. Lever 9 is pivotally mounted at 10 to rod 6, and in turn is pivotally mounted at 11 to base or frame 1.

Connected with rods 5 and 6 is a pair of take-up members 12 and 13 each of which are formed with turned over portions 14 and 15 having apertures passing therethrough for accommodating rods 5 and 6. The turned over portions 14 and 15 may be positioned back any desired distance from the ends of rods 5 and 6 so as to vary the size of the brake to fit properly the friction wheel 3. If there is a slight tightening or loosening of the brake desired the ends 14 and 15 are not adjusted, but the nuts 16 and 17 of each of the take-up members 12 and 13 are manipulated to secure the desired result. Each of the take-up members 12 and 13 is provided with an enlargement or extension 18 which extends at substantially a right angle to the general direction of the take-up. Projecting from the lug or extension 18 is a threaded member 19 which carries nuts 16 and 17. The threaded extension 19 passes through lug 20 projecting upward from an arc shaped member 21 which is bent over for forming member 15. Arc shaped member 21 is also bent over at 22 for forming means for receiving rod 5 whereby the blocks 4 carried by said rod may be clamped by nut 23 against keeper 24. Opposite arc shaped member 21 is a second arc shaped member 25 from which extends lug or projection 18 and also from which extends member 14. Arc shaped members 21 and 25 are arranged to partially inclose certain of the blocks 4 as more clearly shown in Figs. 1, 2 and 3, though if the brake is desired to be extended to its largest extent, extensions 14 and 15 will be positioned adjacent guards 26 and 27. Guards 26 and 27 are each formed with ears or extensions 28 and 29 for preventing the brake from jumping off its friction wheel 3. Guard 27 is designed to have passed therethrough the end of rod 6 which is provided with a nut 29' for bringing under any desired tension blocks 4 of rod 6. If any additional friction blocks 4 should be desired on rod 6 or on rod 5 the same may be easily supplied and a space provided therefor by moving the keepers 24.

Rod 6 is designed to be operated by lever 9 and rod 5 is designed to be connected to the base or frame 1 by means of an adjustable rod 30 and by means of an adjustable cross bar 31. The cross bar 31 is slidingly mounted upon rod 5 and may be adjusted upon rod 30 by nuts 32 and 33. Rod 30 also may be adjusted in relation to base 1 by means of nuts 34 and 35. By the provision of bolt 30 and the various adjustments in connection therewith rod 5 may be variously positioned or adjusted around the brake wheel 3, and also rod 6 may be variously positioned.

What I claim is:

1. The combination with a drum, of a brake therefor comprising a plurality of blocks arranged in groups on each side of said drum, a rod passing through each of said groups, means for spacing said blocks, an adjustable member connecting said groups of blocks at one end, means for holding one of said groups of blocks stationary at one end, and means for pulling the rod passing through the other of said groups for causing all of said blocks to grip said drum.

2. The combination with a drum, of a brake therefor comprising a plurality of blocks formed in groups arranged on opposite sides of said drum, a rod loosely passing through each of said groups of blocks, resilient means for spacing said blocks, an adjustable member connecting said groups of blocks at one end, means for holding one of said groups of blocks stationary at one end, and means for pulling the rod passing through the other of said groups for causing all of said blocks to grip said drum.

3. In a brake mechanism a plurality of friction members, cushioning means between the members, means for bringing the same into a gripping position, and a take-up member connecting said friction members, said take-up member comprising substantially arc shaped members adapted to partially surround said friction members, and adjustable means connecting said arc shaped members for adjusting the position of the same and said friction members in relation to each other.

In testimony whereof I affix my signature in presence of two witnesses.

JOHN CRITY CRENSHAW.

Witnesses:
W. M. BUCHANAN,
F. D. THOMPSON.